(No Model.)
A. HOAK.
VELOCIPEDE.
No. 341,911. Patented May 18, 1886.
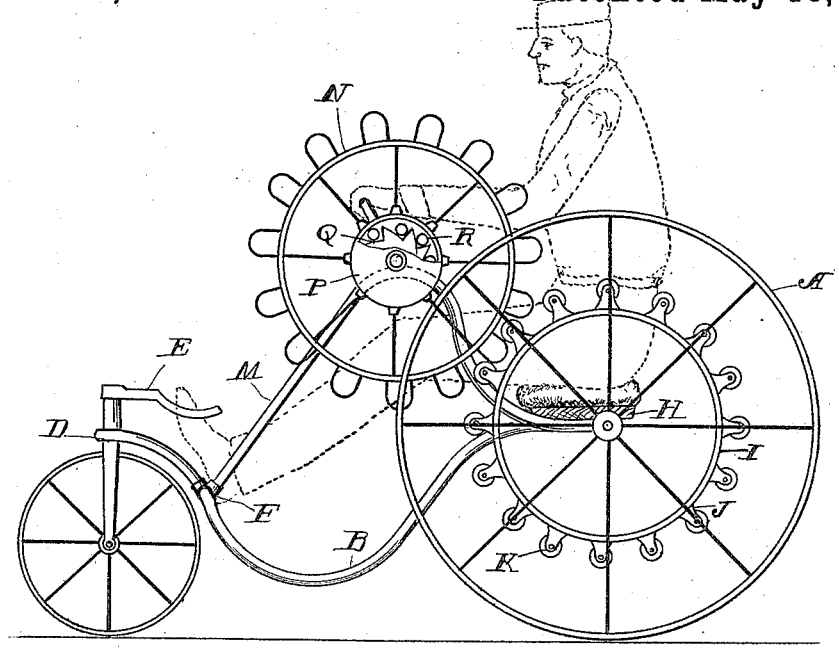
Fig. 1.
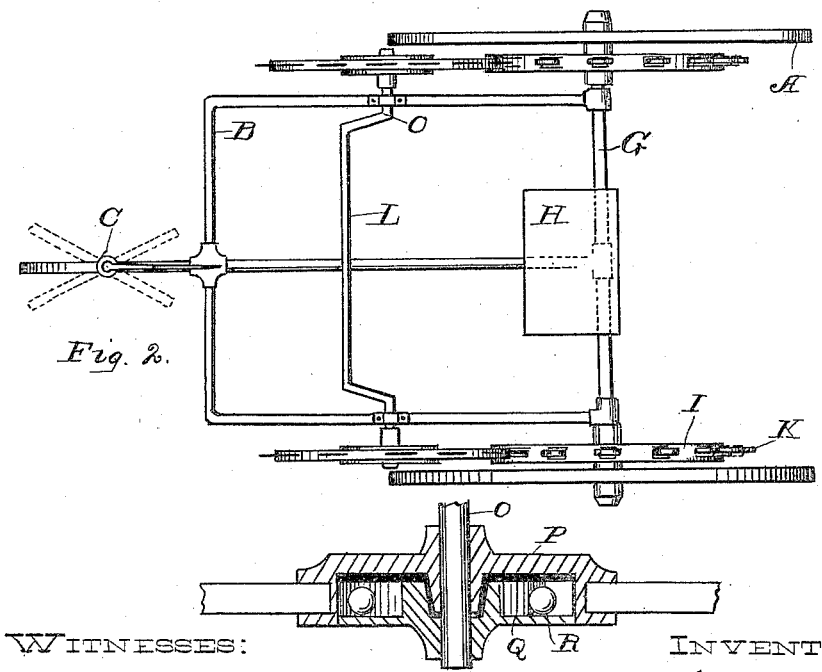
Fig. 2.
Fig. 3.
WITNESSES:
Robert Kirk
Dugald McKillop
INVENTOR:
Amos Hoak
By
Attorney.

UNITED STATES PATENT OFFICE.

AMOS HOAK, OF MILLERSVILLE, PENNSYLVANIA.

VELOCIPEDE.

SPECIFICATION forming part of Letters Patent No. 341,911, dated May 18, 1886.

Application filed August 25, 1885. Serial No. 175,320. (No model.)

*To all whom it may concern:*

Be it known that I, AMOS HOAK, of Millersville, in the county of Lancaster and State of Pennsylvania, have invented a new and useful Improvement in Velocipedes, which improvement is fully set forth in the following specification and accompanying drawings, in which—

Figure 1 is a side view of my improved velocipede. Fig. 2 is a plan view of the same, and Fig. 3 an enlarged sectional view of the impact roller motion.

This invention relates to the class of improvements known as "velocipedes," wherein I provide a pair of driving-wheels journaled to a suitable frame having forwardly a small guide-wheel. Inwardly from the drive-wheels, upon the same axle, I provide a pair of gear-wheels, and in place of the ordinary cogs use a series of anti-friction rollers designed to engage with large cogs of a pair of spur-wheels journaled to the frame above and somewhat forward of the driving-wheels. The shaft-gearing of these spur-wheels consists of impact roller motions, so that the crank centrally on the shaft, within easy reach of the operator upon the seat and between the driving-wheels, may be effectually operated by the hand, and a lever from the guide-wheel is designed to be in such a position as to be within easy reach of the operator's feet forwardly, so that no difficulty will be encountered in guiding the device, all of which will now be fully set forth.

In the accompanying drawings, A represents a pair of drive-wheels of any suitable size, journaled to a suitable metallic frame, B, having forward centrally a small guide-wheel, C, the upper part of the stem D connecting with the wheel journaled vertically to the said frame B. Rearwardly from the upper end of this stem a lever, E, is provided, extending nearly to the foot-board F, secured transversely to the sides of the frame B. The said frame B is designed to be curved downwardly somewhat at this place for this purpose. Between the drive-wheels A, over the axle G, connecting the two, a seat, H, is placed. Laterally from this seat H, inwardly from the wheels A, and upon a common axle, G, I provide a pair of spur-wheels, I, and the spurs or arms J of these wheels, instead of being used as ordinary cogs, are provided at their outer ends with a series of anti-friction rollers, K. Upwardly and forward of these spur-wheels I, I provide a transverse hand-crank shaft, L, parallel with the axle G, and journaled in an independent arm, M, of the frame B. At the outer ends of this shaft spur-wheels N are placed, designed to engage with the anti-friction rollers K of the spur I. Centrally the shaft L forms a crank, O, within easy reach of the operator upon the seat H. The spur-wheels I and N are designed to be geared or speeded up or down, and the friction-rollers K upon the arms of the spur-wheel I are designed to reduce the friction of the two wheels to a minimum.

The hub-wheel of the spur-wheel N forms a shell having therein a small spur-wheel, Q, and between the spurs a series of metal rollers, R, the whole forming an impact roller motion or ratchet, so that the spur-wheels may revolve independent of the shaft L and crank O.

The operation of this device is very simple. The operator seated within the machine operates the crank O of the shaft L, and the spur-wheels N, engaging with the spur-wheels I, move the vehicle forward. The steering-wheel C is operated by the feet in connection with the lever E.

What I claim as new is—

1. In a velocipede, a pair of drive-wheels journaled on the axle, having inwardly on said axle spur-wheels provided with anti-friction rollers, to engage with a pair of spur-wheels having impact roller motions on a parallel shaft above and forward of the drive-wheels, the said shaft formed centrally with a hand-crank within easy reach of the operator, substantially as herein set forth.

2. The combination of the drive-wheels A, the frame B, the axle G, having thereon the drive-wheels and spur-wheels I, the transverse crank-shaft L, the pinions N, the spur-wheel Q, and the impact rollers R, the foot-board F, and the guide-wheel C, the whole arranged as and for the purpose substantially as herein set forth.

In testimony that I claim the foregoing I have hereunto set my hand, this 3d day of August, 1885, in the presence of witnesses.

AMOS HOAK.

Witnesses:
ISAAC M. GROPP,
B. FRANK BRENBARGER.